July 13, 1926.
M. BRLAS
STUMP PULLER
Filed Jan. 23, 1924
1,592,132
2 Sheets-Sheet 1
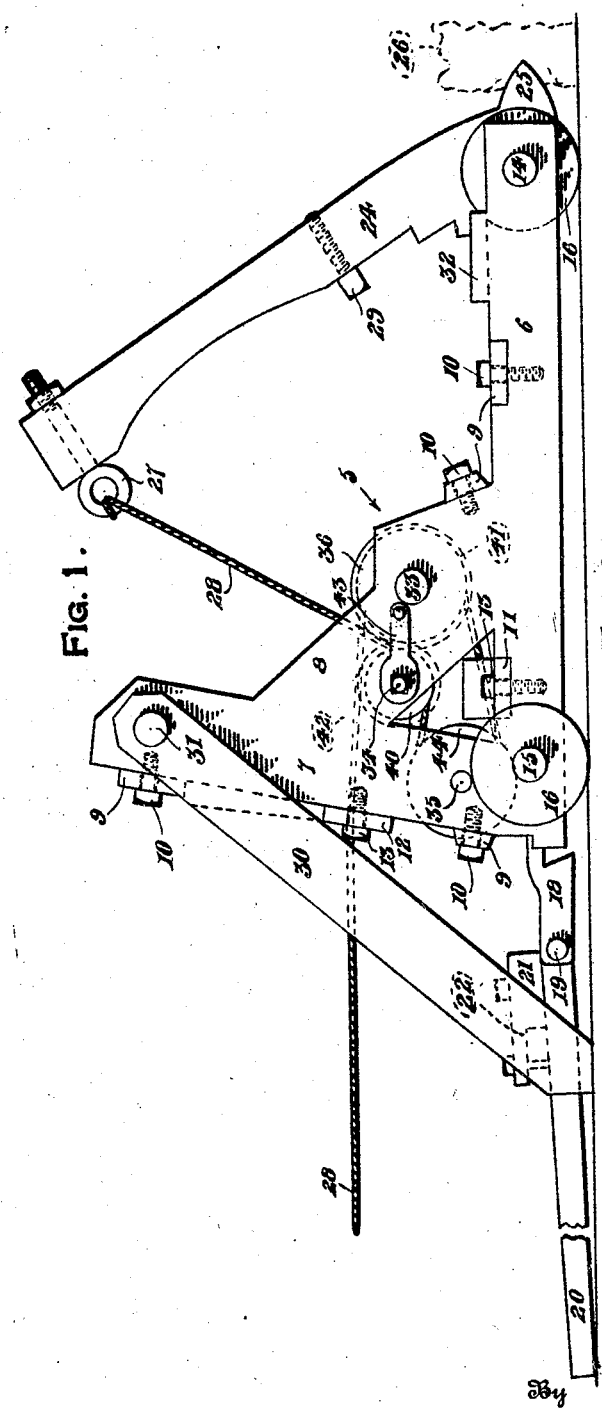
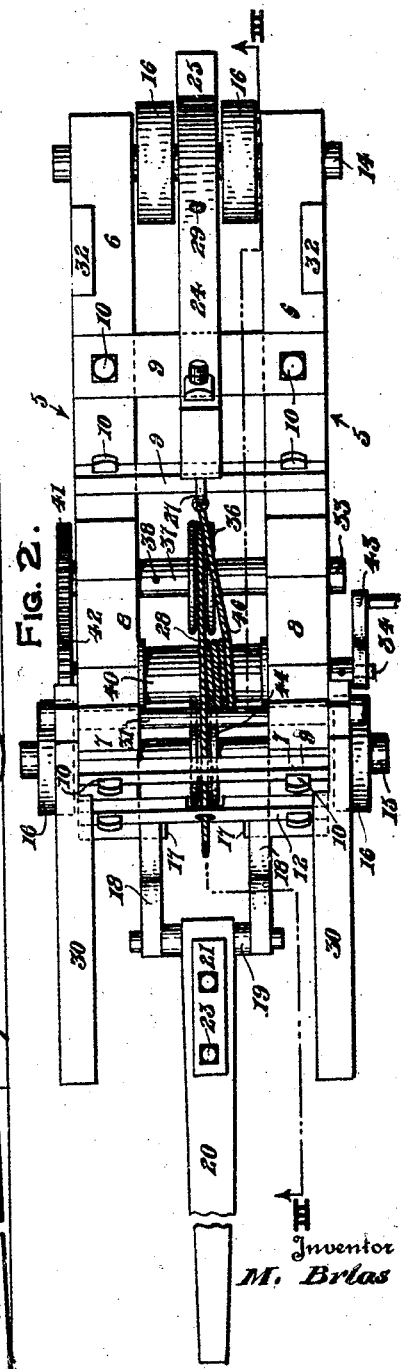
Inventor
M. Brlas
By F. H. Bryant
Attorney.

July 13, 1926.
M. BRLAS
STUMP PULLER
Filed Jan. 23, 1924
1,592,132
2 Sheets-Sheet 2
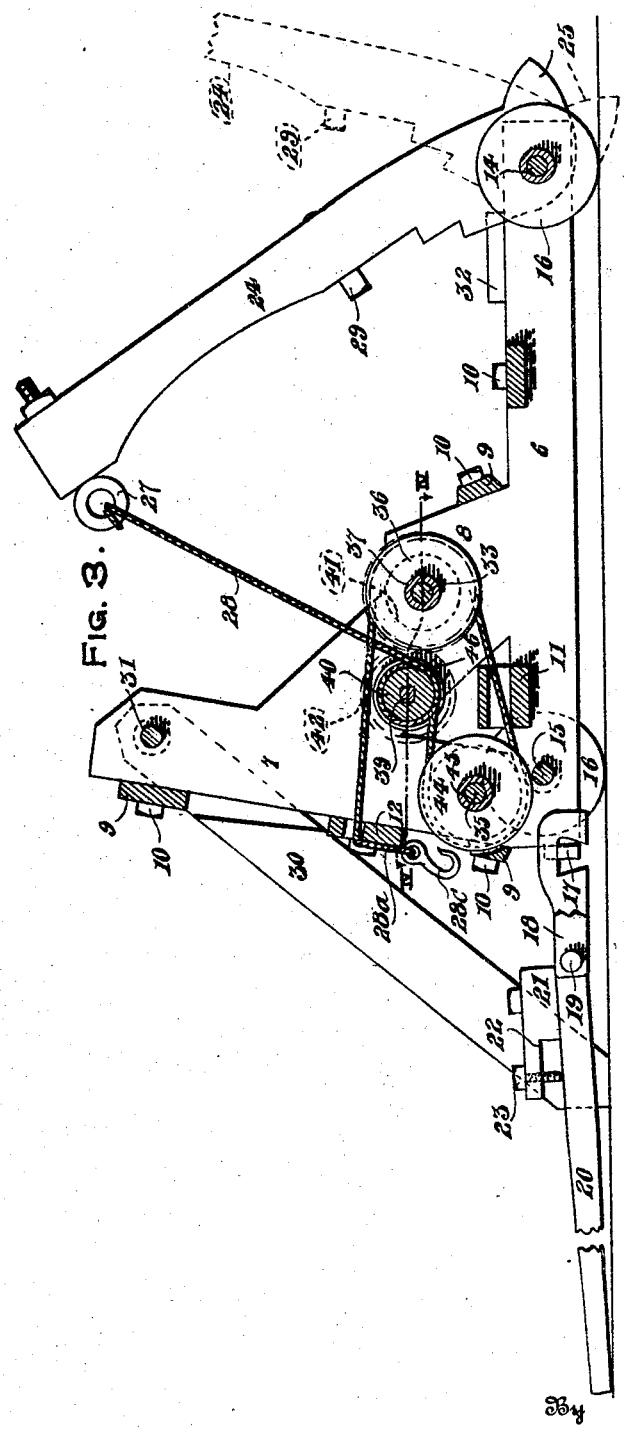
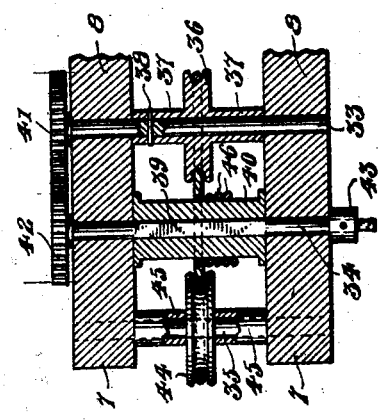
Inventor
M. Brlas
By
Attorney.

Patented July 13, 1926.

1,592,132

UNITED STATES PATENT OFFICE.

MATT BRLAS, OF INDIANA HARBOR, INDIANA.

STUMP PULLER.

Application filed January 23, 1924. Serial No. 697,985.

This invention relates to new and useful improvements in stump pullers.

An important object of the invention is to provide a stump puller of very rigid construction that is especially adapted for extra heavy work.

A further object of the invention is to provide a stump puller that employs an external source of power, such as horses, a tractor, or a truck, for operating the necessary mechanism to produce the vertical pull required to perform the work the device is adapted for.

Other objects of the invention will be apparent during the course of the following description.

In the accompanying drawings forming a part of this specification and in which like numerals are employed to designate like parts throughout the same, Figure 1 is a side elevational view of the stump puller embodying this invention, Figure 2 is a top plan view of the stump puller shown in Fig. 1, Figure 3 is a longitudinal vertical sectional view taken upon lines III—III of Fig. 2, and Figure 4 is a longitudinal horizontal sectional view taken upon lines IV—IV of Fig. 3.

In the drawings, wherein for the purpose of illustration is shown a preferred embodiment of this invention, the numeral 5 designates generally the pair of parallel side frames each of which consists of a base bar 6 and an integrally formed upstanding end bar 7, there being further provided a brace bar 8 which is formed integrally with the base bar 6 and end bar 7 and extends diagonally between the two. The parallel side frames 5 are suitably connected and retained in their proper spaced relation to each other by the cross braces 9 which are removably connected to the said side frames by the fastening elements 10. There is further provided a rope guiding cross brace 11 which connects the base bars in proximity to their points of connection with the upstanding end bars 7. These upstanding end bars are further provided with a rope guiding cross brace 12, as best shown in Figs. 1 to 3 inclusive. These rope guiding cross braces 11 and 12 are secured to the parallel side frames by the fastening means 13. The opposite end of the base bars 6 are provided with axles 14 and 15 which are adapted for having journaled thereon the ground engaging wheels 16 which permit the stump puller to be moved over the ground. The ends of the base bars 6, associated with the upstanding end bars 7, are provided with laterally inwardly projecting bars 17 which are adapted for detachably receiving the notched links 18 which are connected at their outer ends to the cross pin 19 which carries the tongue 20. This tongue is provided with a block 21 having a cutout portion 22 formed in its forward end that receives an externally threaded pin or bolt 23 for the purpose of connecting the whipple-tree portion of harness to the tongue for enabling the stump puller to be drawn over the ground by horses or the like.

The axle 14 has journaled thereon one end of the lever 24 which is provided with a sharpened projection 25 that extends outwardly of the periphery of the ground engaging wheels 16 and is adapted to be forced into engagement with a tree stump, such as is designated by the numeral 26 in Fig. 1, for causing the said stump to be extracted when the inner end of the lever is pulled downwardly for forcing the sharpened projection 25 upwardly in respect to the ground. The free end of the lever 24 is provided with an eye bolt 27 adapted to receive and be attached to one end of the rope or cable 28. The lever 24 is further provided with a bolt 29 having its head associated with the under face of the same for engaging the cross brace 9 positioned therebeneath, when the lever 24 is pivoted by drawing the free end downwardly toward the base bar and upstanding end bars and thereby acting as a stop for preventing the lever from engaging the operating mechanism, carried by the parallel side frames, which will be described at a later point.

For the purpose of preventing the stump puller from being forced away from the stump 26 when the lever 24 is pivoted upon the axle 14, the upper end of each upstanding end bar 7 is provided with a pivotally connected sprag bar 30 which may be positioned as shown in Figs. 1 to 3 inclusive, for causing its outer end to engage the ground for preventing movement of the puller away from the stump. These sprag bars, when not in use, may be swung on their pivot pins 31 to position their free ends upon the integrally formed supporting blocks 32 carried by the base bars 6.

By referring particularly to Figs. 3 and 4, it will be seen that the brace bars 8 and upstanding ends bars 7 are provided with transversely extending rotating shafts 33 and 34 and a stationary rod 35. The rotating shaft 33 is provided with a grooved pulley 36 having sleeve extensions 37 which are keyed, as at 38, to the said shaft for causing the pulley to rotate therewith. The rotating shaft 34 is formed, intermediate its ends, with a squared portion 39 which is adapted to receive the drum 40 which rotates therewith. The projecting ends of the rotating shafts 33 and 34 are provided with the pinion 41 and meshing gear 42 respectively. The opposite end of the shaft 34 is provided with a crank handle 43 which may be employed for rotating the two shafts and consequently the grooved pulley 36 and drum 40. The stationary shaft 35 has journaled thereon a grooved pulley 44 having laterally, axially extending sleeves 45 which are rotatably mounted upon the shaft 35.

It will be seen by inspecting the various figures, that the rope or cable 28, connected at one end to the eye bolt 27 carried by the free end of the lever 24, is first led to the drum 49 and passed therearound any desired number of turns, as indicated by the numeral 46. The rope or cable 28 is then passed once around the grooved pulley 44 and from there through the rope guiding cross brace 11 to the grooved pulley 36. The rope or cable passes around this grooved pulley 36 and extends through the opening formed in the rope guiding cross brace 12 from which it is led longitudinally outwardly for permitting external power, such as horses, oxen, a tractor or an automobile, to be connected to its free end. It is intended that this free end 28ª of the rope or cable 28 be provided with a hook 28ᶜ for permitting the same to be quickly attached and detached to and from the external power. It will be noticed that Fig. 3 shows the rope or cable 28 shortened or of reduced length to the rope or cable illustrated in Figs. 1 and 2. This manner of illustrating the rope or cable in Fig. 3 is for the purpose of showing the hook 28ᶜ that is intended to be carried by the free end.

The operation of the stump puller embodying this invention is as follows:—

It is intended that the stump puller be moved into proximity with the stump to be extracted and with the sharpened projection 25 and lever 24 in the dotted line position shown in Fig. 3. The sprag bars 30 are then pivoted upon their supporting pins 31 to bring the free ends into engagement with the ground outwardly of the opposite end of the parallel side frames to the end carrying the lever 24. These sprag bars will prevent the stump puller from being forced or pulled away from the stump to be extracted. With the device in the position described, the free end of the rope or cable 28 is suitably attached to an external source of power for the purpose of causing the rope to be pulled upon to move the lever upon its supporting member, the axle 14, for causing the sharpened projection 25 to be moved upwardly. This upward movement of the projection will cause the stump to be pulled or extracted from the ground. The crank handle 43 carried by the rotatable shaft 34 may be operated by a person for aiding in pivoting the lever 24. It will be seen by this construction that great leverage may be brought to bear upon the stump to be extracted for the purpose of performing the desired operation.

It is to be understood that the form of this invention herewith shown and described is to be taken as the preferred example of the same, and that various changes in the shape, size, and arrangement of parts may be resorted to without departing from the spirit of the invention or the scope of the subjoined claim.

Having thus described the invention, I claim:—

In a stump puller, a pair of side frames, a stump lifting lever pivoted between said side frames, a winding drum journalled in said side frames, a rope wheel revolubly mounted between said side frames, a second rope wheel journalled in said side frames, gearing connecting the drum and second wheel, and a rope having one end connected to said lever, the rope being wound several times about said drum and led from the drum around the first and second wheels and then forwardly and being provided with a draft hook at its forward extremity.

In testimony whereof I affix my signature.

MATT BRLAS